US006807718B2

(12) United States Patent
Lodholz et al.

(10) Patent No.: US 6,807,718 B2
(45) Date of Patent: Oct. 26, 2004

(54) METHOD FOR ATTACHING A VIBRATION ABSORBER TO A MOUNTAIN SUPPORT

(75) Inventors: Roland Lodholz, Ebringen (DE); Alfred Dietl, Schliengen (DE)

(73) Assignee: Carl Freudenberg KG, Weinheim (DE)

( * ) Notice: Subject to any disclaimer, the term of this patent is extended or adjusted under 35 U.S.C. 154(b) by 95 days.

(21) Appl. No.: 10/342,043

(22) Filed: Jan. 13, 2003

(65) Prior Publication Data

US 2003/0145446 A1 Aug. 7, 2003

(30) Foreign Application Priority Data

Jan. 23, 2002 (DE) .......................................... 102 02 644

(51) Int. Cl.[7] .......................... B23P 17/00; B23P 19/00; B23P 11/02
(52) U.S. Cl. .............................. 29/418; 29/821; 29/453
(58) Field of Search .......................... 29/428, 418, 821, 29/444, 437, 520, 525, 718, 235, 453, 450; 248/638

(56) References Cited

U.S. PATENT DOCUMENTS

| 4,635,892 A | * | 1/1987 | Baker ........................... 248/550 |
| 5,024,464 A | | 6/1991 | Kawaguchi et al. ........ 280/731 |
| 5,906,254 A | * | 5/1999 | Schmidt et al. ............. 188/378 |

FOREIGN PATENT DOCUMENTS

| DE | 3925761 | | 2/1990 |
| JP | 62031735 | * | 2/1987 |

* cited by examiner

Primary Examiner—John C. Hong
(74) Attorney, Agent, or Firm—Davidson, Davidson & Kappel, LLC

(57) ABSTRACT

A method for attaching the elastic spring elements of a vibration absorber to a metallic mounting support, in particular of a vibration absorber that is to be placed in a steering wheel of a motor vehicle to a metal mounting plate or the bottom of the steering wheel, the spring elements having the form of cylindrical pegs which are each provided with a bead featuring an annular groove and which snap into correspondingly designed openings in the metal mounting plate, whereby the vibration absorber (1) and the metal mounting plate (8) are inserted into a device such that they lie one above the other and that the pegs (4) of the vibration absorber (1) are aligned with the openings (9) in the metal mounting plate (8). The extensions (7) provided on the pegs (4) are passed through the openings (9) until the metal mounting plate (8) butts against the bead (5). The extensions (7) then are grasped by grippers (10) and the pegs (4) are pulled further through the openings (9) until the edges of the openings (9) snap into the annular grooves (6), and the extensions (7) are cut off by cutting knives (11).

3 Claims, 5 Drawing Sheets

METHOD FOR ATTACHING A VIBRATION ABSORBER TO A MOUNTAIN SUPPORT

Priority to German Patent Application No. 102 02 644.0, filed Jan. 23, 2002 and hereby incorporated by reference herein, is claimed.

BACKGROUND INFORMATION

The present invention relates to a method for attaching the elastic spring elements of a vibration absorber to a metallic mounting support, in particular of a vibration absorber that is to be placed in a steering wheel of a motor vehicle to a metal mounting plate or directly to the bottom of the steering wheel, the spring elements having the form of cylindrical pegs which are each provided with a bead featuring an annular groove and which snap into correspondingly designed openings in the metal mounting plate.

The attachment of vibration absorbers is accomplished via elastic spring elements which are connected to the vibrating mass and to the machine part to be damped in a very different way. The connection is to be designed such that the vibrating mass does not break off the machine part even in the case of larger vibrations. At the same time, the connection should be as simple as possible in its structural design and require only a small amount of material.

German Patent Application DE 39 25 761 A1 describes a vibration absorber for motor vehicle steering wheels where either the entire air-bag unit or else only the gas generator for inflating the air bag is used as the vibration absorber. The flexible attachment of the air-bag unit or of the gas generator to a support is accomplished by elastic means which are composed of a tubular part with a rivet or else a screw, which connects the vibration absorber mass to the support, being passed through the interior thereof. Such a connection of the vibrating mass and the support is difficult to accomplish and involves considerable problems when mounting the vibrating mass to the support.

A simpler design of the spring elements between the vibrating mass and the metal mounting plate is contained in the older German Patent Document DE 101 42 210.5. There, the spring elements are designed in the form of latching pegs which are pulled into correspondingly designed openings in the metal mounting plate under elastic preload. The insertion of the pegs into the openings provided in the metal plate constitutes a problem in terms of production.

SUMMARY OF THE INVENTION

An object of the present invention is to provide a method which allows easy mounting of the elastic spring elements in the openings of the metal support.

In a method of the species mentioned at the outset, the set objective is achieved according to the present invention in that the vibration absorber and the metal mounting plate are inserted into a device such that they lie one above the other and that the pegs of the vibration absorber are aligned with the openings in the metal mounting plate, in that extensions provided on the pegs are passed through the openings until the metal mounting plate butts against the bead of the pegs, in that the extensions are then grasped by grippers and the pegs are pulled further through the openings until the edges of the openings snap into the annular grooves of the pegs, and in that the extensions are cut off by cutting knives. Using this method, the vibrating mass can be mechanically connected to the metal mounting plate, which allows large numbers of pieces to be produced with the same quality.

BRIEF DESCRIPTION OF THE DRAWING

The drawing schematically shows the individual method steps, namely by only one peg that is connected to the vibrating mass, in which.

DETAILED DESCRIPTION

Figure 1:
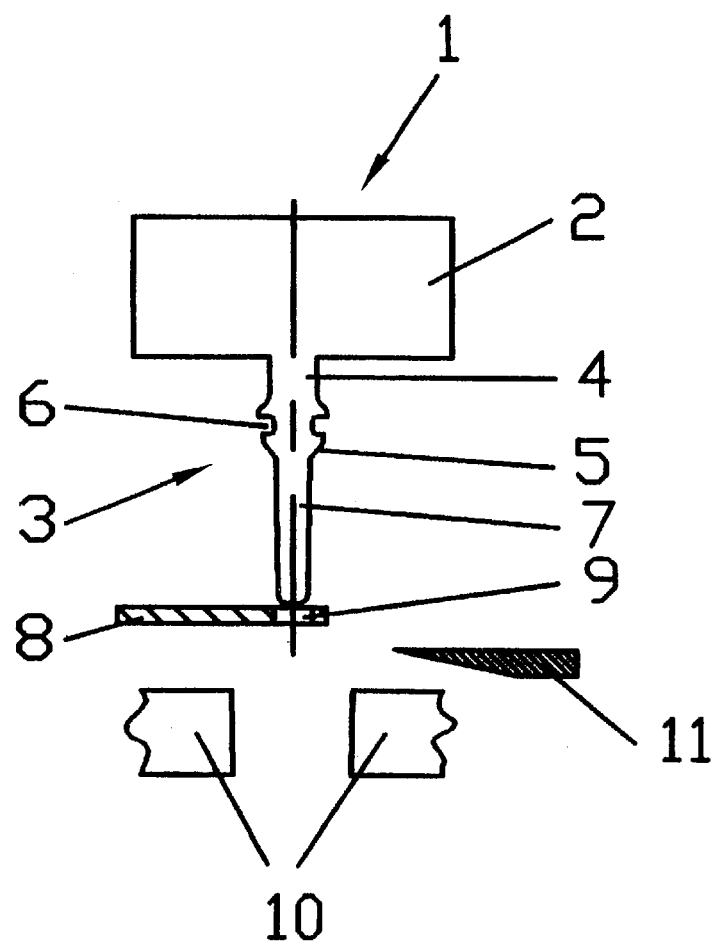
FIG. 1 shows a vibration absorber before insertion into a mounting plate.

FIG. 1 shows a vibration absorber 1 which is composed of a vibrating mass 2 and has vulcanized thereon a spring element 3 made of an elastic material. Spring element 3 is composed of peg 4 including bead 5. Spring element 3 is connected to vibrating mass 2 by vulcanization. Bead 5 is has an annular groove 6 approximately in its middle. Moreover, extension 7 is attached to peg 4 during the vulcanization of vibrating mass 2 and spring element 3. Located below vibration absorber 1 is the metal mounting plate 8, which is provided with opening 9. Opening 9 and peg 4 including extension 7 are in alignment with each other. Metal mounting plate 8 rests on a part of a device having grippers 10. The device is also provided with cutting knife 11. It is pointed out again that this exemplary embodiment reproduces the method only schematically. In the practical implementation, the vibrating mass would be provided with a larger number of pegs and the metal mounting plate with the same number of openings 9, accordingly. Moreover, the device has grippers 10 and a knife 11 for each peg.

Figure 2:
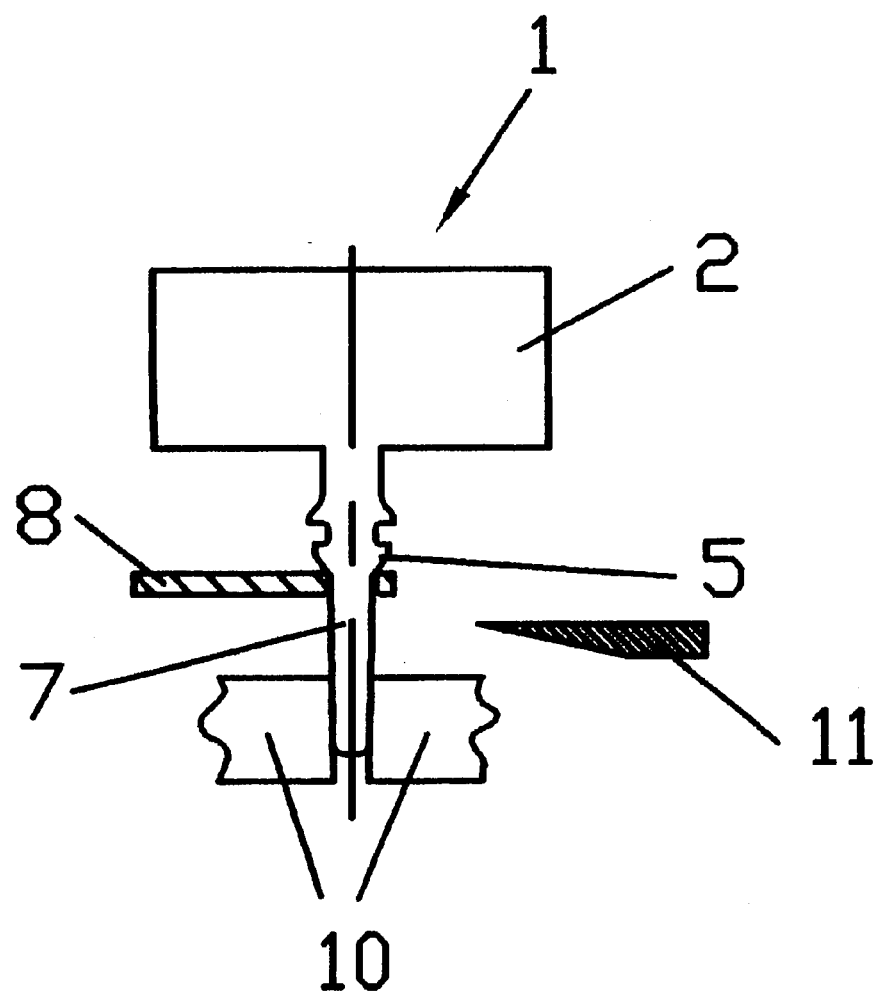
FIG. 2 shows a vibration absorber partially inserted into the mounting plate.
Figure 3:
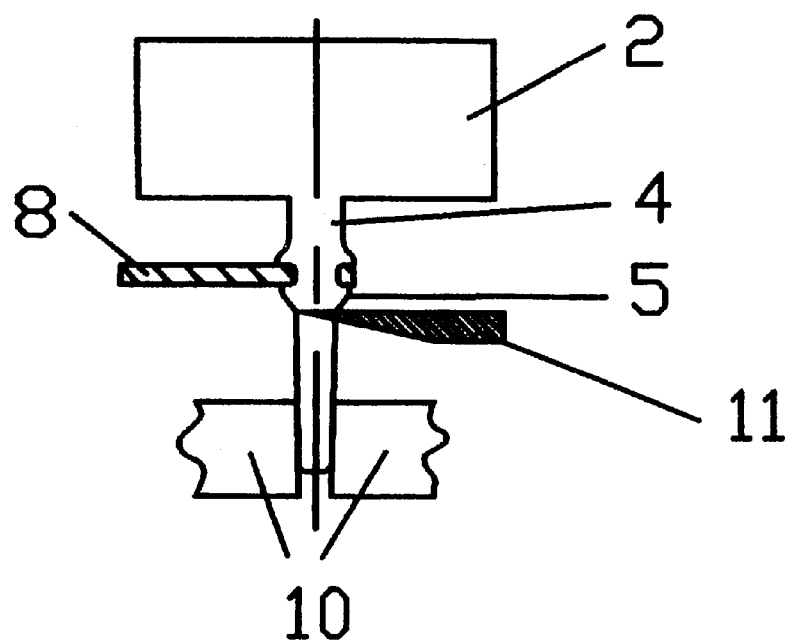
FIG. 3 shows a further method step.

In FIG. 2, extension 7 is stuck through opening 9 until bead 5 makes contact on the edge of opening 9. Then, extension 7 is grasped by gripper 10 and pulled down until metal mounting plate 8 snaps into annular groove 6 of bead 5, as shown in FIG. 3. After that, cutting knife 11 travels forward and cuts extension 7 off the peg 4, as shown in FIG. 3.

Figure 4:
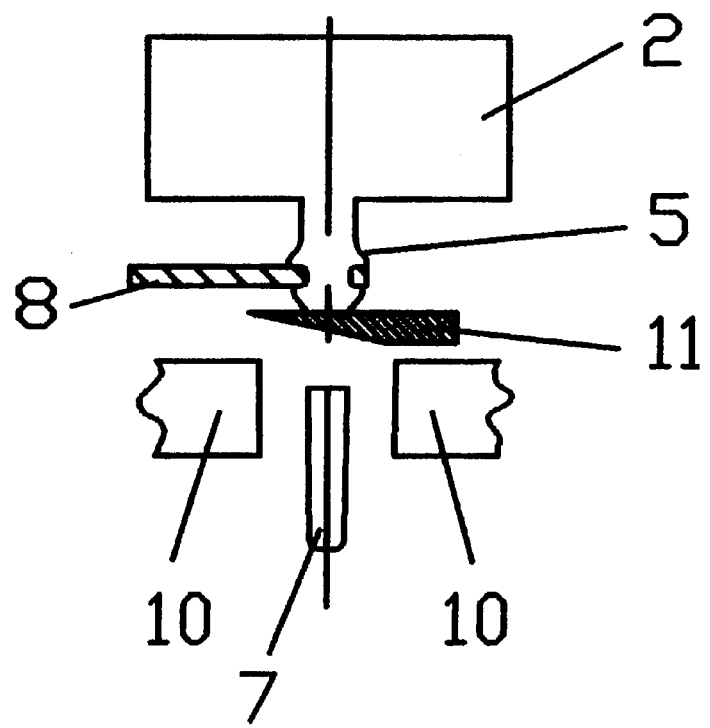
FIG. 4 shows a further method step.

After extension 7 is off the peg 4 below bead 5, grippers 10 are opened and the cut-off extension 7 falls down and away, as shown in FIG. 4.

Figure 5:
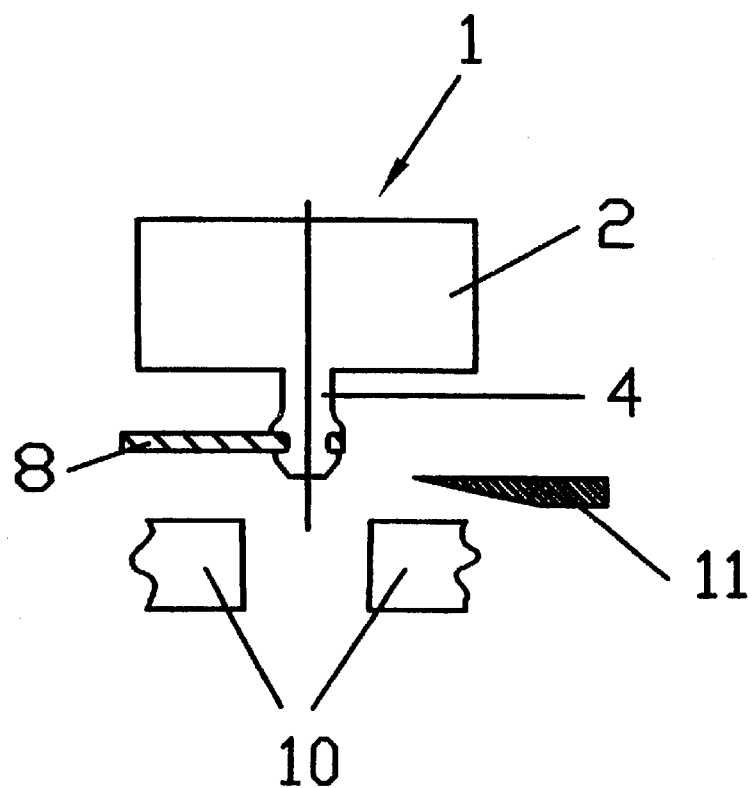
FIG. 5 shows a further method step.

FIG. 5 shows the subsequent return of knife 11 to its original position. The mounting process between vibrating mass 2 and metal mounting plate 8 via elastic peg 4 is thereby completed and vibration absorber 1 can be mounted in the steering wheel via metal mounting plate 8 in a suitable manner.

Metal mounting plate as defined herein can be a any metal piece with openings, including the bottom a steering wheel.

What is claimed is:

1. A method for attaching elastic spring elements of a vibration absorber to a metallic mounting plate, the spring elements having cylindrical pegs, each peg having a bead having an annular groove for snapping into a correspondingly-designed opening in the metal mounting plate, the method comprising the steps of:
    inserting the vibration absorber and the metal mounting plate into a device so that the vibration absorber and the metal mounting plate are disposed above one another and so that the pegs of the vibration absorber are aligned with the openings in the metal mounting plate;
    passing extensions on the pegs through the openings until the metal mounting plate contacts the beads;
    grasping the extensions by grippers and pulling the pegs further through the openings until edges of the openings snap into the annular grooves; and
    cutting off the extensions by cutting knives.

2. A method for attaching elastic spring elements of a vibration absorber for a steering wheel of a motor vehicle to a metallic mounting support, the spring elements having cylindrical pegs, each peg having a bead having an annular groove for snapping into a correspondingly-designed opening in the metal mounting plate, the method comprising the steps of:

inserting the vibration absorber and the metal mounting plate into a device so that the vibration absorber and the metal mounting plate are disposed above one another and so that the pegs of the vibration absorber are aligned with the openings in the metal mounting plate;

passing extensions on the pegs through the openings until the metal mounting plate contacts the beads;

grasping the extensions by grippers and pulling the pegs further through the openings until edges of the openings snap into the annular grooves; and cutting off the extensions by cutting knives.

3. The method as recited in claim 2 wherein the metal mounting plate is a bottom of a steering wheel.

\* \* \* \* \*